(12) United States Patent
Tamada et al.

(10) Patent No.: US 6,406,079 B2
(45) Date of Patent: Jun. 18, 2002

(54) AUTOMOBILE BUMPER CORE

(75) Inventors: Teruo Tamada, Yokohama; Shozo Hattori, Nagoya, both of (JP)

(73) Assignee: Kyoraku Co., Ltd., Kyoto (JP)

( * ) Notice: Subject to any disclaimer, the term of this patent is extended or adjusted under 35 U.S.C. 154(b) by 0 days.

(21) Appl. No.: 09/903,232

(22) Filed: Jul. 11, 2001

(51) Int. Cl.[7] .............................................. B60R 19/03
(52) U.S. Cl. ..................................... 293/120; 293/133
(58) Field of Search ............................... 293/120, 102, 293/132, 133

(56) References Cited

U.S. PATENT DOCUMENTS

| | | | |
|---|---|---|---|
| 3,666,310 A | | 5/1972 | Burgess et al. |
| 3,856,613 A | | 12/1974 | Weller |
| 3,933,387 A | * | 1/1976 | Salloum et al. ......... 293/120 X |
| 4,029,350 A | * | 6/1977 | Goupy et al. ........... 293/133 X |
| 4,652,031 A | | 3/1987 | Loren et al. |
| 4,856,833 A | * | 8/1989 | Beekman .................... 293/102 |
| 4,900,076 A | | 2/1990 | Kolb et al. |
| 4,904,008 A | | 2/1990 | Glance |
| 4,951,986 A | * | 8/1990 | Hanafusa et al. ....... 293/120 X |
| 5,005,887 A | | 4/1991 | Kelman |
| 5,056,840 A | | 10/1991 | Eipper et al. |
| 5,269,574 A | | 12/1993 | Bhutani et al. |
| 5,727,826 A | * | 3/1998 | Frank et al. ................. 293/102 |
| 5,780,129 A | * | 7/1998 | Ohta ....................... 293/102 X |
| 5,785,367 A | | 7/1998 | Baumann et al. |
| 6,000,738 A | * | 12/1999 | Stewart et al. .............. 293/102 |
| 6,227,582 B1 | * | 5/2001 | Ichien ........................ 293/132 |
| 6,247,745 B1 | * | 6/2001 | Carroll et al. .......... 293/133 X |
| 6,315,339 B1 | * | 11/2001 | Devilliers et al. .......... 293/120 |

FOREIGN PATENT DOCUMENTS

| JP | 03-125649 | | 5/1991 |
|---|---|---|---|
| JP | 8-108812 A | * | 10/1994 |

* cited by examiner

Primary Examiner—Joseph D. Pape
Assistant Examiner—Jason Morrow
(74) Attorney, Agent, or Firm—Scott J. Asmus; Vernon C. Maine; Maine & Asmus Noshua NH (57) ABSTRACT

The automobile bumper core according to the present invention provides greater impact absorbing qualities from impact forces. The core (3) comprises a surface wall (8) and an opposing rear wall (9), with a pair of opposing side walls (7). In one embodiment there are a plurality of ribs (10) and a plurality of hollow portions (6) between the surface wall (8) and the rear wall (9). The bumper core is intended to lie disposed inside the bumper fascia (2) and the resulting bumper is attached to the automobile.

14 Claims, 10 Drawing Sheets

AUTOMOBILE BUMPER CORE

CROSS REFERENCE TO RELATED APPLICATIONS

This application claims priority under 35 U.S.C. Section 119 from Japanese Patent Application No. 2000-215083, No. 2000-215084, and No. 2000-215085 filed on Jul. 14, 2000 and a Japanese Patent Application No. 2000-385930 filed on Dec. 19, 2000, which is incorporated herein for all purpose.

BACKGROUND OF THE INVENTION

The present invention relates to a bumper for an automobile, and more particularly to a bumper core that is excellent in impact absorption and integrally disposed in the bumper.

Automobile bumpers ideally provide protection in the event of serious collisions. It is also desired that the bumper have energy absorbing properties to lessen the severity of the accident.

Bumpers should have the ability to deform during smaller accidents and to return to the original shape without incurring expensive repairs. In addition to these concerns, there are also automotive requirements that ensure the bumpers can withstand certain safety requirements.

While most vehicles have both front and rear bumpers, the automobile industry recognizes that the requirements differ between the front and rear bumpers. Front bumpers are usually configured to have greater rigidity in order to accommodate a more severe crash. Rear bumpers generally are made to absorb less severe crashes and to return to the original shape in minor collisions.

The more common bumper has an outer shell and a rigid bumper beam. The bumper beam is a longitudinal reinforcing member, generally tubular, that is affixed to the car body. This metal reinforcing member provides the structural strength in the event of a collision. These are well known in the art and provide satisfactory protection for severe crashes. In minor collisions these bumpers tend to be easily dented and damaged. Thus, repair costs are higher on these vehicles, which affects insurance characteristics, such as the one disclosed in Japanese Patent Application Laid-open No. 3-125649.

Also in the prior art is the use of foam cores that are used primarily in rear bumpers, but also in some front bumpers depending upon the type of vehicle and the cost. It is well known in the industry that to enable a more satisfactory bumper design, it is necessary to combine an outer skin or fascia, some compressible impact absorbing member and a rigid longitudinal member. The foam cores provide some protection in minor crashes by returning the bumper to the original shape. The prior art describes automobile bumpers with an impact absorbing member and front and rear tubular beam reinforcing members disposed inside of a bumper fascia.

In the automobile bumper disclosed in JP-A No. 3-125649, the impact absorbing member and beam reinforcing member are both arranged inside the bumper fascia. However, since the spacing between the bumper fascia and the car body is narrow, it is hard to obtain a sufficient thickness of the impact absorbing member and beam reinforcing member combined in the longitudinal direction for absorbing impact from the outside. This is particularly evident in the rear bumper having a thin and curved shape. These prior art bumper foam members also are expensive to manufacture and integrate into the bumper assemblies. Thus, the prior art foam core is expensive to integrate into a bumper and also has poor impact absorbing properties.

Thus, the prior art design provides insufficient impact absorbing properties and the bumper is likely to suffer denting and damage from even low level impacts. What is needed is a bumper core that is cost-effective to manufacture and install within the bumpers. This bumper core should be designed to withstand significant impact forces and still return to the original shape of the bumper. Such a bumper should increase safety margins as well as lower insurance costs for minor collisions.

SUMMARY OF THE INVENTION

The present invention has been achieved in view of the above-described problems of conventional technologies.

Accordingly, the invention provides for an automobile bumper, comprising a bumper fascia having at least one impact absorbing bumper core attached to an inner surface thereof, the bumper core comprising a hollow body defined by a surface wall attached to the bumper fascia, a rear wall opposed thereto, and a pair of opposed side walls, wherein at least one rib extends within the body from the surface wall to the rear wall. The bumper core is disposed between the inside of the bumper fascia and the car body in a hollow double wall structure in order to provide a bumper which has excellent impact absorption from the outside and is also superb in safety. This bumper provides impact absorbing qualities even in a structure with a thin bumper core in the longitudinal direction between the inside of the bumper fascia and car body, such as the rear bumper.

The automobile bumper cores may be interposed between the bumper fascia and the car body at the inside right and left positions as separate units. The bumper cores are formed in a hollow double wall structure by blow molding of thermoplastic resin as a molded body having a hollow part and having sidewalls upright in the longitudinal direction of the bumper fascia. These units are produced as separate units for the right and left sides of the bumper and easily installed by adhesive or other means known in the art.

The automobile bumper cores of the present invention are preferably composed of thermoplastic resin, and even more preferable if having a modulus of flexural elasticity is 10000 $kg/cm^2$ to 40000 $kg/cm^2$, and the overall mean wall thickness is 0.5 mm to 4.0 mm, and the product of modulus of flexural elasticity and mean wall thickness is 1000 kg/cm to 10000 kg/cm.

The present invention provides an impact absorbing automobile bumper core, comprising a surface wall and an opposing rear wall, and with a pair of opposing sidewalls. The bumper core has one or more ribs and a plurality of hollow portions between said surface wall and said rear wall, and wherein said surface wall attaches to an inner surface of a bumper fascia and said rear wall is attached to an automobile.

The automobile bumper has one or more bumper cores formed in a structure having a buffer section composed of a rib for linking between the surface wall corresponding to the inside of the bumper fascia and the rear wall corresponding to the car body.

The impact absorbing automobile bumper core may comprise a surface wall and an opposing rear wall, and a pair of opposing sidewalls. The bumper core has one or more ribs and a plurality of hollow portions between the surface wall and said rear wall, and wherein the surface wall attaches to an inner surface of a bumper fascia. The bumper fascia can attach directly to the car body or connect to a longitudinal structure that is attached on some automobiles.

The bumper fascia may be attached in a longitudinal manner to an automobile in a longitudinal manner having a driver side section, and a passenger side section, wherein said bumper core sections are affixed to said inner surface of the bumper fascia at a driver side and a passenger side.

The rib for linking between the surface wall corresponding to the inside of the bumper fascia and the rear wall corresponding to the car body may be composed of plural concave ribs. The concave ribs are preferably formed in a circular or elliptical sectional shape.

The bumper core are preferably characterized by an integral structure in which the concave ribs composing the buffer section are formed from the surface wall and rear wall, and abutting and fusing in the hollow space.

The circular concave ribs preferably contract in diameter in the hollow space direction from the opening end of the surface wall or rear wall, the diameter of the contracting angle α being 5 to 30 degrees, and the diameter β of the opening end being 10 to 40 mm.

In one embodiment, part of the sidewall of the bumper core is indented to the hollow space side to form ribs of the molded body. The rib portion may be formed by indenting part of the sidewall of the bumper core to the hollow space side is semicircular, the rib portion being contracted in diameter in the hollow space direction from the opening end of the surface wall or rear wall of the impact absorbing member, the diameter contracting angle α is suitably 5 to 30 degrees, and the radius β of the opening end is suitably 5 to 20 mm.

The bumper cores may have a plurality of coupling ribs for integrally linking the plurality of concave ribs. Each coupling rib of the bumper cores is preferably a longitudinal rib extending from the surface wall in the rear wall direction, or from the rear wall in the surface wall direction.

The bumper of the invention provides impact absorbing qualities even in a structure with a thin bumper core in the longitudinal direction between the inside of the bumper fascia and car body, such as the rear bumper.

Still other objects and advantages of the present invention will become readily apparent to those skilled in this art from the following detailed description. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designated like structural elements, and in which.

The drawings illustrate the rear bumper as an example of the bumper for automobile according to an embodiment of the invention.

DETAILED DESCRIPTION OF THE PREFERRED EMBODIMENTS

Figure 1:
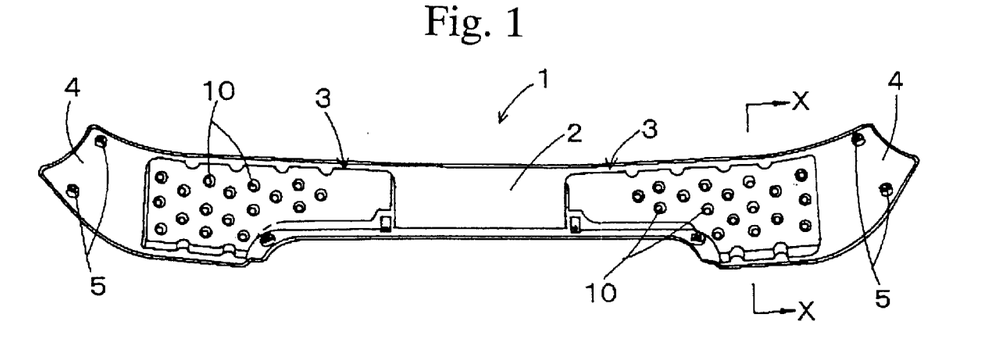
FIG. 1 is an overall perspective view of a rear bumper as seem from inside.

It is understood that the preferred description is a presentation of one or more embodiments of the invention and is not specifically limited or narrowed by this particular description. In FIG. 1, numeral 1 is a rear bumper. The rear bumper 1 comprises a bumper fascia 2 and a pair of bumper cores 3 for absorbing impact from the outside. The bumper cores 3 are interposed at the right and left positions between the bumper fascia 2 and the car body. The bumper fascia and bumper core making up the bumper assembly, which is affixed directly to the automobile. The bumper assembly of the present invention can also be attached to a longitudinal support that is part of the vehicle and provides greater collision safety.

The right and left sides of the bumper fascia 2 are formed in a curvature along the side surface of the car body, and at the inside of the curved portions 4 there is an affixing portion 5 for affixing to the car body by screwing or fastening. In one embodiment the bumper fascia 2 is made of thermoplastic resin. Although the rear bumper is described, it is within the scope of the invention to incorporate the bumper cores in either front or rear bumpers.

Figure 2:
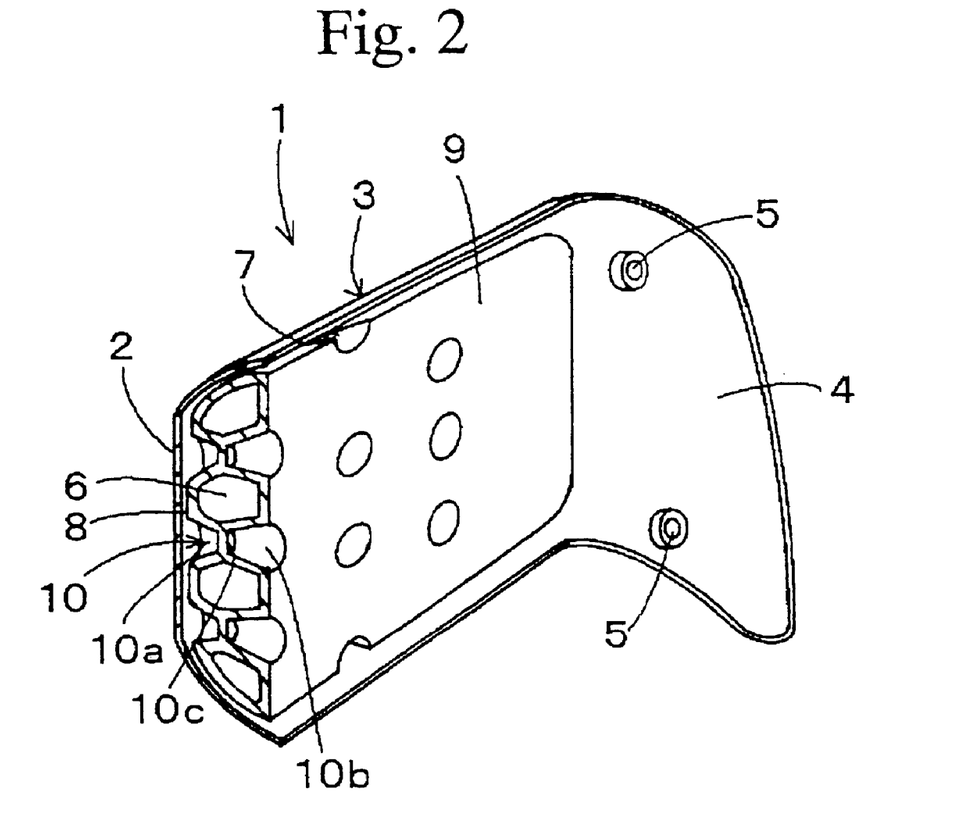
FIG. 2 is a section view in X—X direction in FIG. 1.

As shown in FIG. 2, the right bumper core 3 as seem from the inside of the bumper fascia 2 has a hollow part 6 in a hollow double wall structure by blow molding of thermoplastic resin, and it is a closed hollow molded body having upright sidewalls 7 in the longitudinal direction of the bumper fascia 2. This bumper core 3 has a rib 10 for linking between a surface wall 8 corresponding to the inside of the bumper fascia 2 and a rear wall 9 corresponding to the car body (not shown). The rib 10 is composed of concave ribs 10a, 10b formed respectively from the surface wall 8 and rear wall 9, being mutually fused inside the hollow portion 6 to be formed into an integral shape, and 10c is a fused plate portion. The concave ribs 10a, 10b are circular in sectional shape, but may be also formed in an elliptical sectional shape. The left bumper core 3 as seen from the inside of the bumper fascia 2 is symmetrical to the right bumper core 3 and is identical in structure. The bumper cores 3 are secured to the bumper fascia 2 by conventional means such as adhering or gluing. As the bumper cores are sectional, they can be asymmetrically designed for specific applications.

Figure 3:
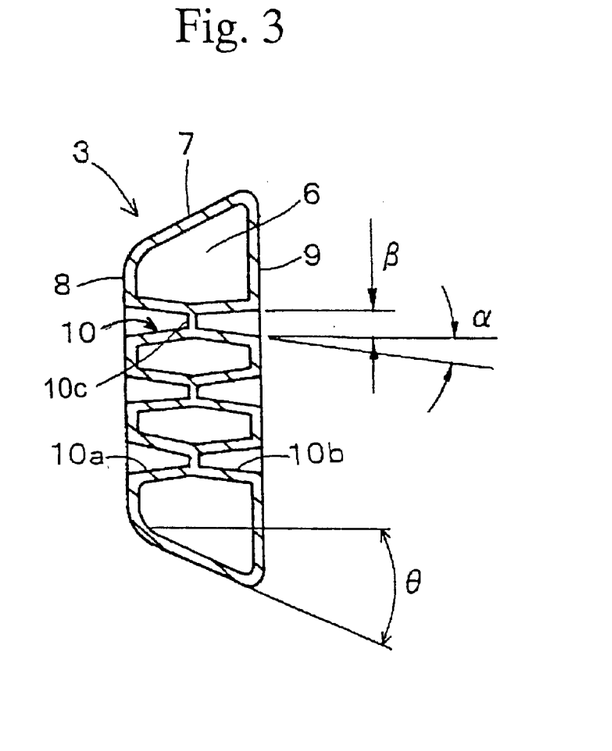
FIG. 3 is a sectional view showing a detailed structure of a bumper core in a first embodiment.

As shown in FIG. 3, the inclination angle θ of the sidewall 7 to the perpendicular line of the surface wall 8 is preferred to be 0 to 50 degrees in order to obtain a sufficient impact absorbing effect. The concave ribs 10a, 10b are conical shaped being wider in diameter at the surface wall 8 or rear wall 9, as opposed to the center at the fusing portion 10c. Such conical or cone shape may have the appearance of a cup and have a flattened portion instead of a point at the smaller diameter.

In the preferred embodiment, the angular dimension of the diameter contracting angle α is 5 to 30 degrees, and the diameter β of the opening end is 10 to 40 mm. The cone shape can encompass a sharp cone nose or have a flush nose end. By forming the concave ribs 10a, 10b in this range to compose the buffer portion, it is known by experimentation that the highest shock absorbing effect of the bumper cores 3 is obtained against the impact acting on the bumper 1. It is within the scope of the invention that the concave ribs 10a, 10b may be also formed in other shapes The bumper cores 3 are composed of thermoplastic resin of which modulus of flexural elasticity is 10000 kg/cm$^2$ to 40000 kg/cm$^2$, and the overall mean wall thickness is 0.5 mm to 4.0 mm, and the product of modulus of flexural elasticity and mean wall thickness is 1000 kg/cm to 10000 kg/cm. The modulus of flexural elasticity is the value established by testing according to the Japan Industrial Standard (JIS) K 7113. This testing methodology uses specimen type No. 2 and is measured at a pulling rate of 2 mm/min.

Examples of thermoplastic resin for composing the bumper cores 3 include high density polyethylene resin, polypropylene resin, polyamide resin, polyethylene terephthalate resin, polybutylene terephthalate resin, polycarbonate resin, acrylonitrile butadiene styrene resin (ABS resin), acrylonitrile styrene resin (AS resin), acrylonitrile acrylic rubber styrene copolymer (AAS resin), polyphenylene ether resin (PPO resin), and their blends.

Figure 4:
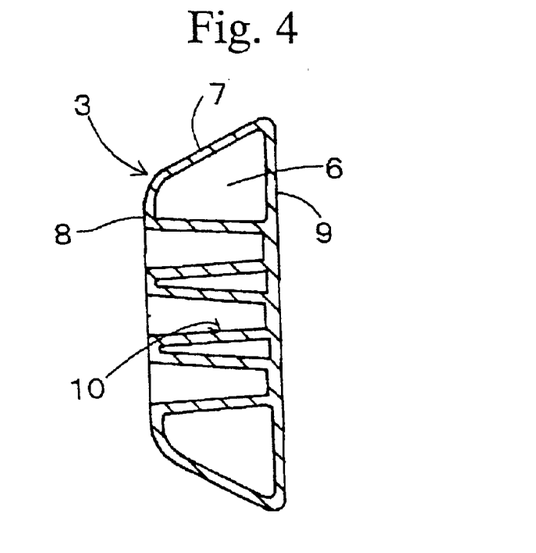
FIG. 4 is a sectional view showing a sectional structure of a bumper core in a second embodiment.

FIG. 4 shows a second embodiment of the right bumper core 3. The left bumper core 3 is symmetrical in shape, but is identical in structure. In the bumper core 3, a rib 10 is formed from a surface wall 8, and is fused to a rear wall 9, and a buffer portion is composed by the rib 10 which links the surface wall 8 and rear wall 9. There is no fused portion 10c as described in the first embodiment.

Figure 5:
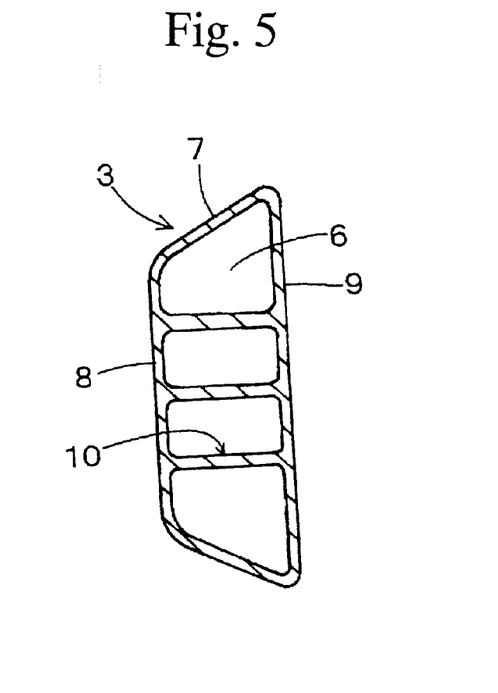
FIG. 5 is a sectional view showing a sectional structure of a bumper core in a third embodiment.
Figure 6:
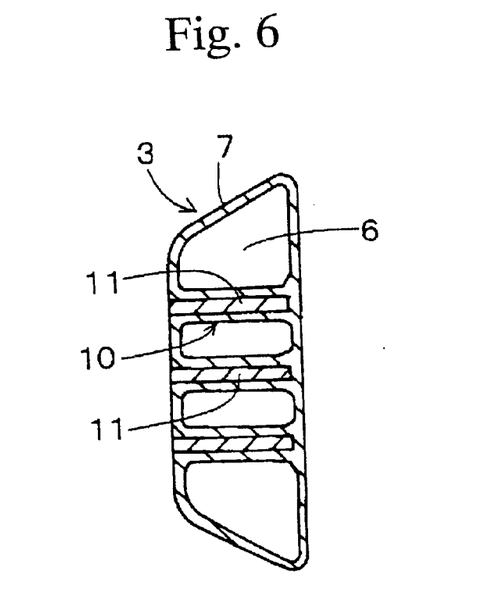
FIG. 6 is a sectional view showing a sectional structure of a bumper core in a fourth embodiment.
Figure 7:
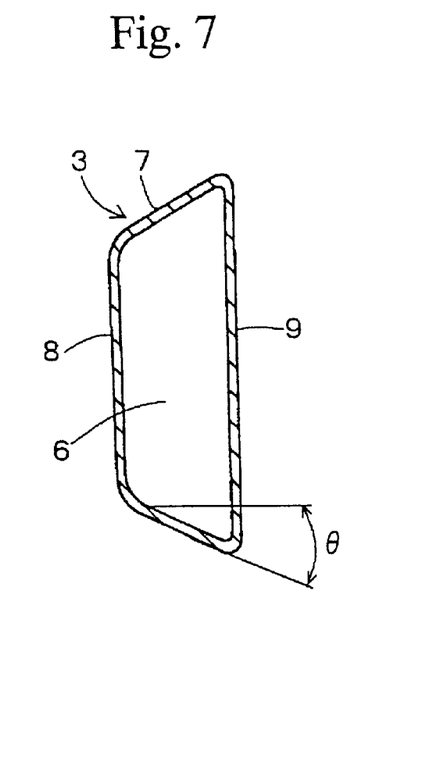
FIG. 7 is a sectional view showing a sectional structure of a bumper core in a fifth embodiment.

FIG. 5, FIG. 6, and FIG. 7 show other examples (third to fifth embodiments) of the bumper cores 3. In FIG. 5 to FIG. 7, the right bumper core 3 is shown, but the left bumper core 3 is symmetrical in shape, and is identical in structure.

In the bumper core 3 shown in FIG. 5 (third embodiment), the rib 10 for linking a surface wall 8 and a rear wall 9 is formed as a plate in the hollow part 6. In this manner the rib 10 is termed an "inner rib" extending from the rear wall 9 to the surface wall 8. In the bumper core 3 shown in FIG. 6 (fourth embodiment), a plate 11 for reinforcing the inner rib is buried and the rib 10 is formed to provide a stronger reinforcing member between the surface wall 8 and a rear wall 9. The buried plate 11 is a thicker structure and provides greater reinforcing strength for the inner rib 10. In this embodiment the inner rib is not a concave structure but is as illustrated in the figures.

The bumper core 3 shown in FIG. 7 (fifth embodiment) is a hollow double wall structure without the rib for linking between surface wall 8 and rear wall 9. The inclination angle θ' of the sidewall 7 to the perpendicular line of the surface wall 8 is preferred to be 0 to 50 degrees in order to obtain a sufficient impact absorbing effect.

Figure 8:
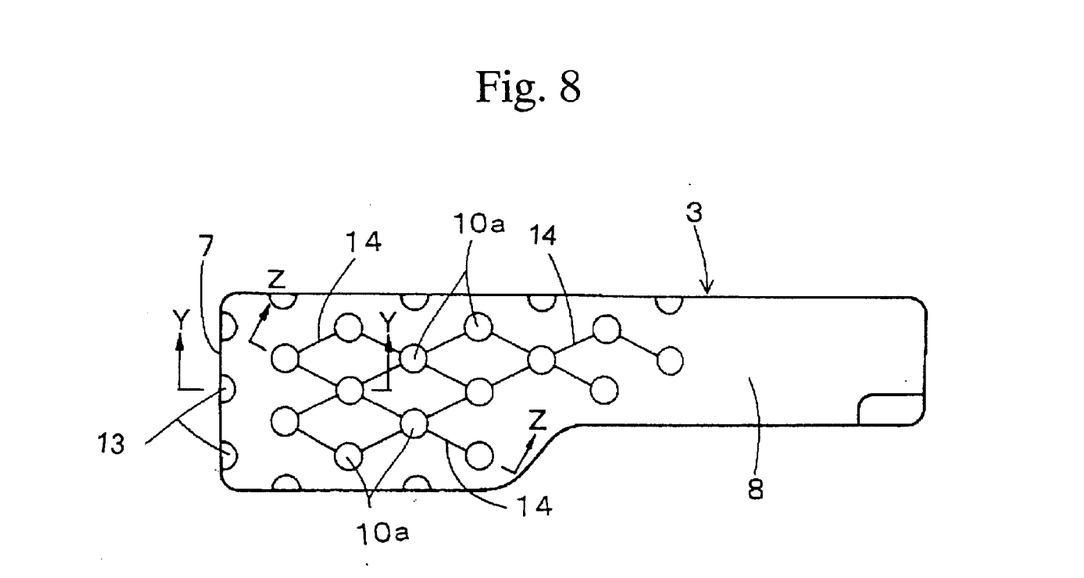
FIG. 8 is a front view of a bumper core in a sixth embodiment.
Figure 9:
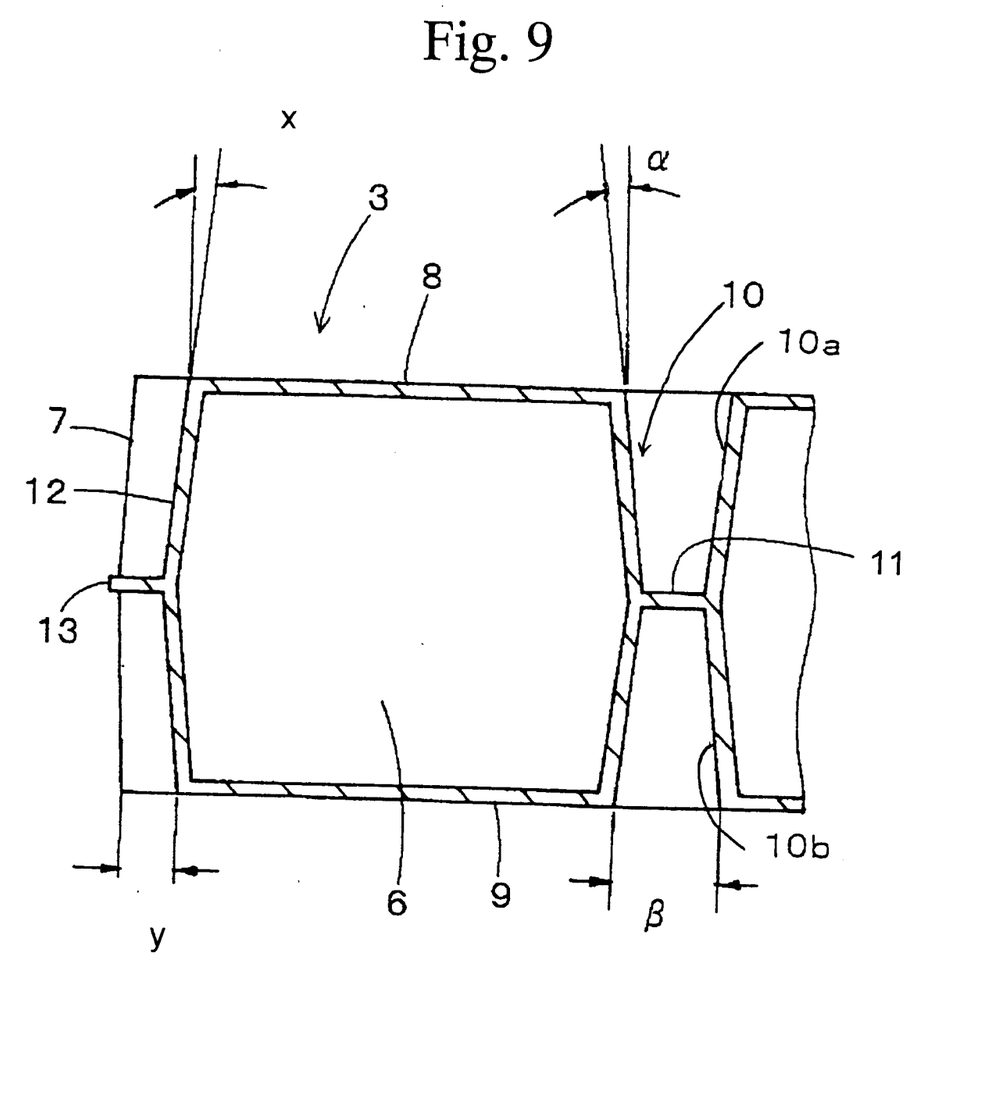
FIG. 9 is a sectional view in Y—Y direction in FIG. 8.
Figure 10:
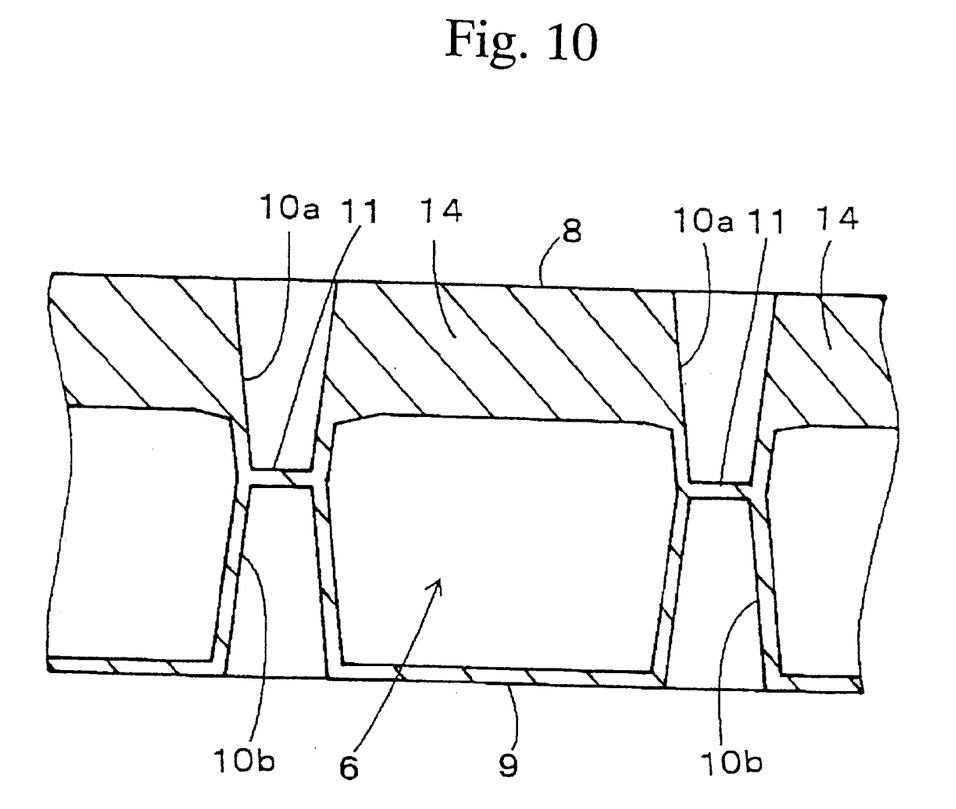
FIG. 10 is a sectional view in Z—Z direction in FIG. 8.
Figure 11:
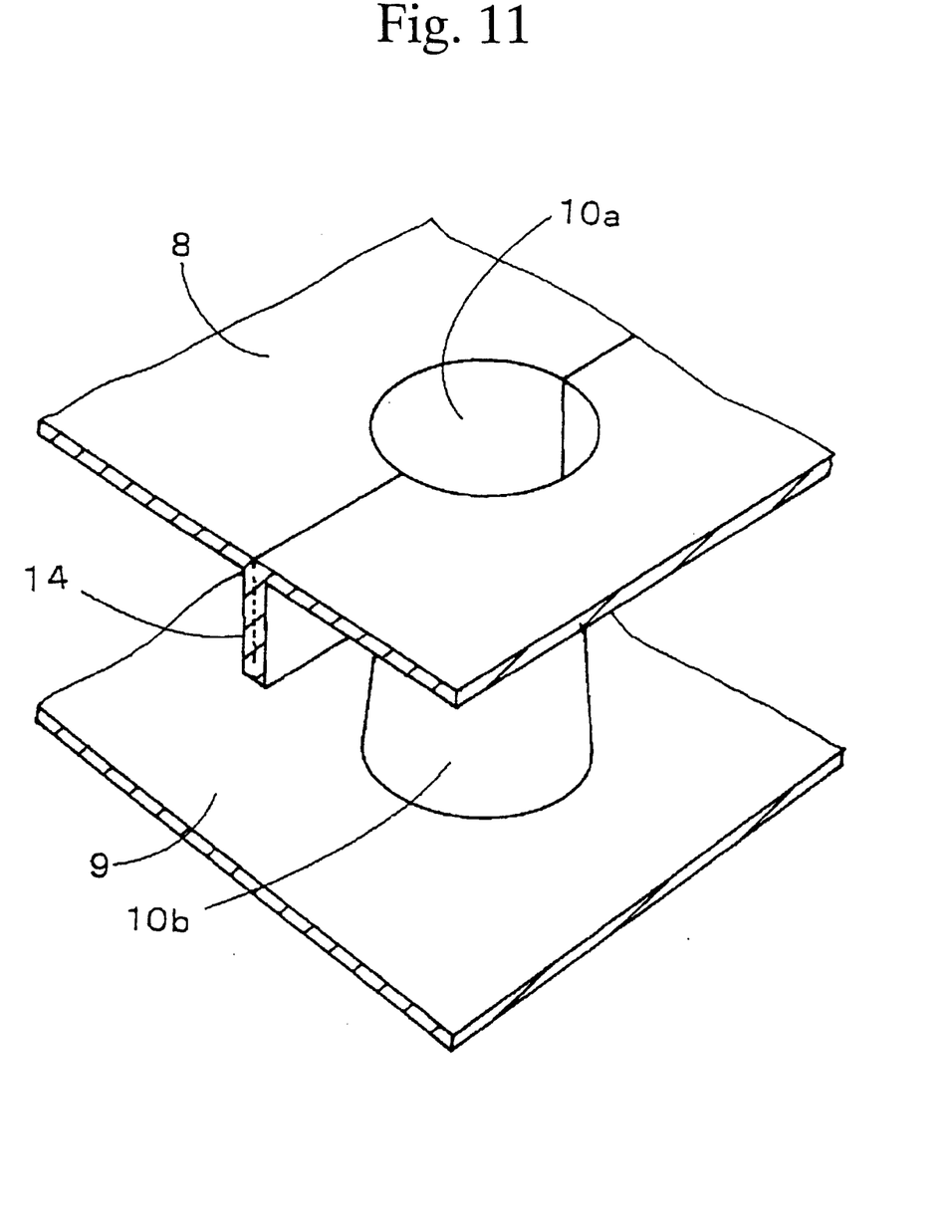
FIG. 11 is a perspective view showing an essential section of FIG. 8.

FIG. 8 to FIG. 11 relates to a sixth embodiment. FIG. 8 is a front view of the bumper core as seen from the rear wall side. FIG. 9 is a sectional view along line Y—Y in FIG. 8. FIG. 10 is a sectional view along line Z—Z in FIG. 8, and FIG. 11 is a perspective view of portions of FIG. 8.

The bumper core 3 of the sixth embodiment, the shape of the rib 10 is the same as the concave ribs 10a, 10b shown in FIG. 3. In part of the sidewall of the bumper core 3, one or more rib portions 12 also called sidewall ribs are recessed in the hollow portion 6 and are formed at specified intervals. The sidewall ribs 12 are semicircular, and are contracted in diameter in the hollow part direction from the opening end of the surface wall 8 or rear wall 9 of the bumper core 3, and the diameter contracting angle x is 5 to 30 degrees, and the radius y of the opening end is 5 to 20 mm.

As shown by rib portion 12, a plate or fusing portion 13 is formed nearly in the middle between the surface wall 8 and rear wall 9 in order to enhance the reinforcing effect. By forming the rib portion 12 with the diameter contracting angle x is 5 to 30 degrees, and the radius y of the opening end is 5 to 20 mm, it is known by experimentation that the highest shock absorbing effect of the bumper core 3 is obtained against impact acting on the bumper 1.

The multiple concave ribs 10a of the bumper core 3 of the sixth embodiment are integrally linked by coupling ribs 14 that join adjacent ribs together. The coupling rib 14 also called tie-up rib is a longitudinal rib formed to extend in the direction of the rear wall 9 from the surface wall 8. The coupling rib 14 is formed like an inner rib with the longitudinal rib concealed in the hollow part 6 as shown in FIG. 11. This inner coupling rib 14 is made by integrating two walls of the parison into a plate by air pressure after forming the concave portion from the surface wall 8 toward the hollow portion 6 in the blow molding process. By using this coupling or tie-up rib 14, the position and direction of the concave ribs 10a can be held in a constant profile. As the shape and profile of concave rib 10a is maintained by this coupling rib 14, the properties and characteristics of the bumper core are consistent. In particular, from the viewpoint of buffering effect, the coupling rib 14 is preferred to be formed integrally with the concave ribs 10a at the surface wall 8 side as shown in FIG. 11.

Figure 12:
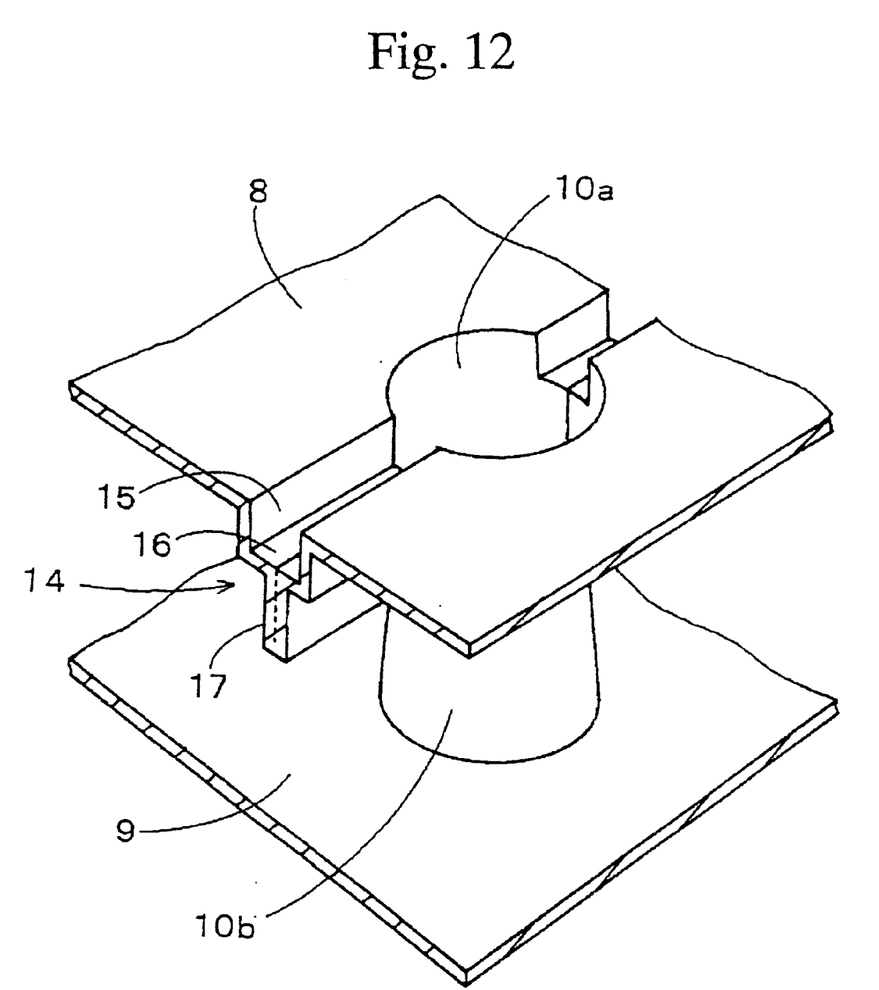
FIG. 12 is a perspective view showing other example of FIG. 11.
Figure 13:
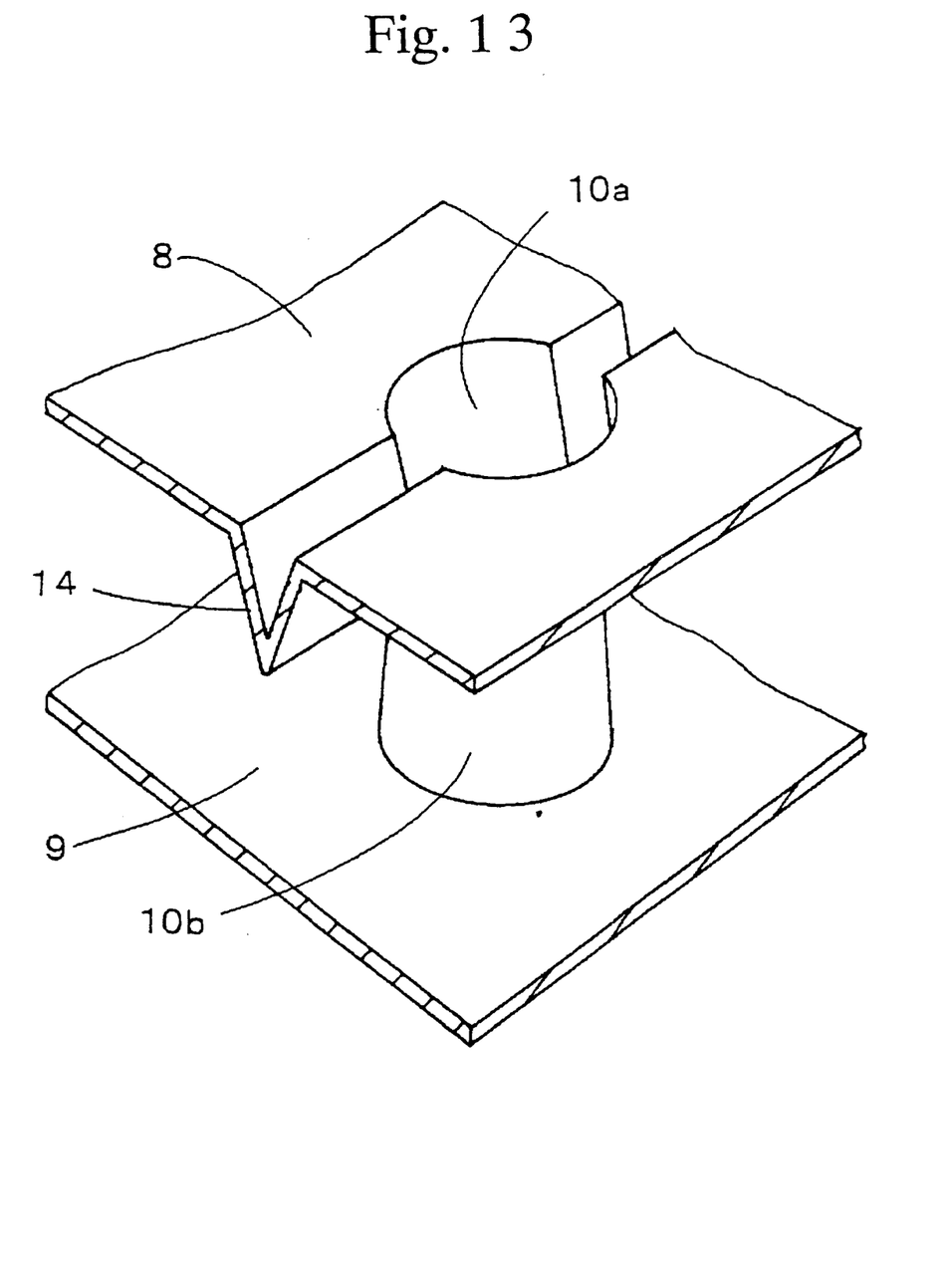
FIG. 13 is a perspective view showing another example of FIG. 11.

Other forms of the coupling rib 14 for mutually linking multiple concave ribs 10a, 10b, in other embodiments are shown in FIG. 12 and FIG. 13.

In the embodiment shown in FIG. 12, the coupling rib 14 is formed in a groove or notch from the surface wall 8 side, and a plate 17 is formed from the bottom of the groove 16 disposed in the direction to the rear wall 9 side. The plate 17 is comprised of two walls pressed together by air and molded into a single plate, wherein the dotted line represents the melt line. By forming the coupling rib 14 in such shape, the strength and rigidity of the bumper cores 3 are enhanced.

In the embodiment shown in FIG. 13, the coupling rib 14 is formed in a V-shaped groove, and by forming in this shape, the strength and rigidity of the bumper cores 3 are also enhanced.

The automobile bumper according to the invention is intended to provide greater impact absorbing qualities from outside impact forces. The invention has bumper cores interposed between the bumper fascia and the car body at the inside right and left positions, and the bumper cores are closed molded bodies formed in a hollow double wall structure by blow molding of thermoplastic resin as a molded body having a hollow part and having sidewalls upright in the longitudinal direction of the bumper fascia, and are therefore excellent in rigidity against impact and restoration after deformation in spite of small space in the longitudinal direction. Hence, even in a structure admitting only a bumper core of small space in the longitudinal direction between the inside of the bumper fascia and car body, such as the rear bumper, absorption of impact from outside and safety can be enhanced.

The bumper cores of the bumper of the invention are composed of thermoplastic resin of which modulus of flexural elasticity is 10000 kg/cm² to 40000 kg/cm², and the overall mean wall thickness is 0.5 mm to 4.0 mm, and the product of modulus of flexural elasticity and mean wall thickness is 1000 kg/cm to 10000 kg/cm, and therefore they are excellent in rigidity against impact and restoration after deformation, and further by the structure forming the ribs for linking between the surface wall and rear wall of the bumper core, the rigidity against impact and restoration after deformation are further enhanced.

The bumper cores of the bumper of the invention are closed molded bodies having a buffer section composed of concave ribs for linking between the surface wall corresponding to the inside of the bumper fascia and the rear wall corresponding to the car body, or part of the sidewall of the bumper cores is recessed to the hollow part side to be formed into rib-like molded bodies, so that a higher impact absorption and safety may be obtained.

In the bumper cores of the present invention, since the coupling rib is formed to join plural adjacent concave ribs mutually, the position and direction of the concave ribs can be held in a constant profile in the event of collision. This enables the bumper core to be positioned within the bumper fascia with the optimal impact absorption in a specific direction. Selective directional impact absorption can be accommodated by positioning the bumper core in the regions likely to receive impact.

Furthermore, since plural rib portions are recessed to the hollow portions and formed at specified intervals in the sidewall, a high shock absorbing effect results.

Since other modifications and changes varied to fit particular operating requirement, and environments will be apparent to those skilled in the art, the invention is not considered limited to the example chosen for purposes of disclosure, and covers all changes and modifications which do not constitute departures from the true spirit and scope at this invention.

Having thus described the invention, what is desired to be protected by Letters Patent is presented in the subsequently appended claims.

What is claimed is:

1. An impact absorbing automobile bumper, comprising: a bumper fascia and one or more bumper pore sections, said bumper core sections having a surface wall and an opposing rear wall, a pair of opposing sidewalls, and wherein said bumper core sections have one or more ribs and a plurality of hollow portions between said surface wall and said rear wall, and wherein said surface wall attaches to an inner surface of a portion of a driver side of said bumper fascia and a portion of a passenger side of said bumper fascia, and said bumper fascia is attached to an automobile in a longitudinal manner, and wherein said bumper core sections are composed of a thermoplastic resin with a modulus of flexural elasticity of about 10000 kg/cm² to 40000 kg/cm², and an overall mean wall thickness is about 0.5 mm to 4.0 mm, and a product of modulus of flexural elasticity and mean wall thickness is about 1000 kg/cm to 10000 kg/cm.

2. The automobile bumper according to claim 1, wherein said ribs are hollow concave ribs having a midsection fusing portion and outwardly expanding from said fusing portion to said surface wall and said rear wall and having a hole opening at both said surface and said rear wall.

3. The automobile bumper according to claim 2, wherein said bumper core is an integral structure by forming said concave ribs and abutting and fusing in said hollow portions.

4. The automobile bumper according to claim 1, wherein said ribs are hollow conical ribs extending between said surface wall and said rear wall, having a hole opening on either said surface wall or said rear wall.

5. The automobile bumper according to claim 2, wherein said concave ribs are angularly projecting with an angle α in the range of 5 to 30 degrees, and an end diameter β is in the range of 10 to 40 mm.

6. The automobile bumper according to claim 1, further comprising one or more sidewall ribs, wherein a portion of said sidewalls is indented into said hollow portion to form said sidewall ribs.

7. The automobile bumper according to claim 6, wherein said sidewall ribs are semicircular with an angle x in the range of 5 to 30 degrees, and a radius y in the range of 5 to 20 mm.

8. The automobile bumper according to claim 1, wherein said sidewall has an inclination angle in the range of 0 to 50 degrees.

9. The automobile bumper according to claim 1, wherein said ribs are inner ribs projecting substantially perpendicular from said surface wall to said rear wall.

10. The automobile bumper according to claim 9, further comprising a buried plate disposed substantially parallel to said inner ribs.

11. The automobile bumper according claim 1, further comprising a plurality of coupling ribs for integrally linking said concave ribs, wherein said coupling ribs are longitudinal sections interconnecting said concave ribs and disposed on either said surface wall or said rear wall.

12. The automobile bumper according to claim 11, wherein said coupling ribs are formed in a longitudinal groove.

13. The automobile bumper according to claim 11, wherein said coupling ribs are formed in a V-shaped groove.

14. The automobile bumper according to claim 4, wherein said conical ribs are angularly projecting with an angle α in the range of 5 to 30 degrees, and an end diameter β is in the range of 10 to 40 mm.

* * * * *

UNITED STATES PATENT AND TRADEMARK OFFICE
CERTIFICATE OF CORRECTION

PATENT NO.   : 6,406,079 B2
DATED        : June 18, 2002
INVENTOR(S)  : Tamada, Teruo et al.

It is certified that error appears in the above-identified patent and that said Letters Patent is hereby corrected as shown below:

<u>Title page,</u>
Item [30], Foreign Application Priority Data, insert
-- Foreign Application Priority Data July 14, 2000 [JP] 2000-215083; July 14, 2000 [JP] 2000-215084; July 14, 2000 [JP] 2000-215085; December 19, 2000 [JP] 2000-385930 --.

Item [57], ABSTRACT,
Line 7, delete "lie", insert -- be --.

Item [74], delete "Noshua", insert -- Nashua --.

<u>Column 7,</u>
Line 45, delete "pore", insert -- core --.

Signed and Sealed this

Fifth Day of November, 2002

Attest:

JAMES E. ROGAN
Attesting Officer    Director of the United States Patent and Trademark Office